United States Patent
Fukazawa et al.

(10) Patent No.: US 7,759,277 B2
(45) Date of Patent: Jul. 20, 2010

(54) FUEL CELL CATALYST, PROCESS FOR PREPARATION OF THE SAME, AND MEMBRANE ELECTRODE ASSEMBLY AND FUEL CELL EMPLOYING THE CATALYST

(75) Inventors: Taishi Fukazawa, Tokyo (JP); Wu Mei, Yokohama (JP); Yoshihiko Nakano, Yokohama (JP); Tsuyoshi Kobayashi, Kawasaki (JP); Itsuko Mizutani, Yokohama (JP); Hiroyasu Sumino, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/407,076

(22) Filed: Mar. 19, 2009

(65) Prior Publication Data
US 2009/0246589 A1    Oct. 1, 2009

(30) Foreign Application Priority Data
Mar. 27, 2008   (JP) .............................. 2008-082915

(51) Int. Cl.
*B01J 21/00*    (2006.01)
*H01M 4/00*    (2006.01)

(52) U.S. Cl. ...................... 502/242; 502/101; 502/339; 502/246; 502/247; 502/248; 502/254; 502/255; 502/256; 502/257; 502/258; 502/259; 502/261; 502/262; 502/263; 502/305; 502/308; 502/309; 502/310; 502/311; 502/312; 502/313; 502/314; 502/315; 502/319; 502/320; 502/321; 502/322; 502/323; 502/349; 502/350; 502/351; 502/352; 502/353; 502/354; 502/355; 502/327; 502/332; 502/334; 502/325; 502/180; 502/182; 502/185; 429/40; 429/41; 429/42; 429/43; 429/44; 429/45; 429/30; 429/523; 429/524; 427/115; 427/150; 427/255.28; 204/192.15

(58) Field of Classification Search ................. 502/325, 502/101, 242, 246–248, 254–259, 261–263, 502/305, 308–315, 319–323, 327, 332, 334, 502/339, 349–355, 180, 182, 185; 429/40–45, 429/30, 523–524; 427/115, 250, 255.28; 204/192.15
See application file for complete search history.

(56) References Cited

U.S. PATENT DOCUMENTS
3,506,494 A    4/1970    Adlhart
(Continued)

FOREIGN PATENT DOCUMENTS
JP    2005-259557    9/2005
(Continued)

OTHER PUBLICATIONS
U.S. Appl. No. 12/401,255, filed Mar. 10, 2009, to Mei.

*Primary Examiner*—Steven Bos
*Assistant Examiner*—Pritesh Darji
(74) *Attorney, Agent, or Firm*—Finnegan, Henderson, Farabow, Garrett & Dunner, L.L.P.

(57) ABSTRACT

The present invention provides a catalyst having high activity and excellent stability, a process for preparation of the catalyst, a membrane electrode assembly, and a fuel cell. The catalyst of the present invention comprises an electronically conductive support and catalyst fine particles. The catalyst fine particles are supported on the support and are represented by the formula (1): $Pt_u Ru_x Ge_y T_z$ (1). In the formula, u, x, y and z mean 30 to 60 atm %, 20 to 50 atm %, 0.5 to 20 atm % and 0.5 to 40 atm %, respectively. When the element represented by T is Al, Si, Ni, W, Mo, V or C, the content of the T-element's atoms connected with oxygen bonds is not more than four times as large as that of the T-element's atoms connected with metal bonds on the basis of X-ray photoelectron spectrum (XPS) analysis. When the T-element is Ti, Hf, Sn, Ta, Zr or Nb, the content of the T-element's atoms connected with metal bonds is not more than twice as large as that of the T-element's atoms connected with oxygen bonds on the basis of XPS analysis.

17 Claims, 1 Drawing Sheet

U.S. PATENT DOCUMENTS

| | | |
|---|---|---|
| 6,171,721 B1 | 1/2001 | Narayanan et al. |
| 2004/0072061 A1* | 4/2004 | Nakano et al. ................ 429/44 |
| 2007/0254806 A1* | 11/2007 | Mei et al. ................... 502/325 |
| 2008/0233465 A1 | 9/2008 | Mizutani et al. |
| 2008/0241639 A1 | 10/2008 | Mei et al. |
| 2009/0029219 A1 | 1/2009 | Fukazawa et al. |
| 2009/0081391 A1 | 3/2009 | Mei et al. |
| 2009/0082198 A1 | 3/2009 | Mei et al. |

FOREIGN PATENT DOCUMENTS

| | | |
|---|---|---|
| JP | 2007-87617 | 4/2007 |
| JP | 2007-194217 | 8/2007 |

* cited by examiner

US 7,759,277 B2

FUEL CELL CATALYST, PROCESS FOR PREPARATION OF THE SAME, AND MEMBRANE ELECTRODE ASSEMBLY AND FUEL CELL EMPLOYING THE CATALYST

CROSS-REFERENCE TO RELATED APPLICATION

This application is based upon and claims the benefit of priority from the prior Japanese Patent Application No. 82915/2008, filed on Mar. 27, 2008; the entire contents of which are incorporated herein by reference.

BACKGROUND OF THE INVENTION

1. Field of the Invention

The present invention relates to a catalyst, a membrane electrode assembly, a fuel cell, and a process for preparation of the catalyst.

2. Background Art

A fuel cell can convert chemical energy directly into electrical energy, and is an eco-friendly device of power generation. It, therefore, has recently attracted the attention of people. In fact, for example, a direct methanol fuel cell (hereinafter, often referred to as "DMFC") and a polymer electrolyte fuel cell (hereinafter, often referred to as "PEFC") have such high theoretical conversion efficiencies as 97% and 83%, respectively.

The DMFC does not need to be equipped with a reformer since liquid fuel is directly fed, and suitably works at a low temperature. Accordingly, it is particularly expected to adopt the DMFC as an alternative power supply replacing a secondary battery for cellular phones.

Generally in the DMFC, platinum is mainly employed as a methanol oxidizing catalyst at present. However, it is known that, if platinum is used as the catalyst, carbon monoxide is often generated as an intermediate product to poison the surface of platinum and, as a result, to considerably lower the catalytic activity.

In order to avoid the poisoning, many means have been studied. For example, it is proposed to replace the platinum with PtRu alloy. It is presumed that, when the PtRu alloy is used as the catalyst, oxygen species adsorbed on the Ru surface react with carbon monoxide adsorbed on the Pt surface, so as to prevent the carbon monoxide from poisoning and consequently to avoid the deterioration of catalytic activity. However, it is a problem that this means consumes a great deal of expensive noble metals. It is, therefore, very important to develop a new catalyst having high activity and less consuming noble metals.

Meanwhile, it has been also studied for years to incorporate other metals into the platinum or the PtRu alloy for further improving the catalytic activity thereof, and various reports have been submitted. For example, it is reported that alloys of platinum with base metals such as Tin and molybdenum are effective in preventing carbon monoxide from poisoning. However, this also has a problem that the additive metals are often dissolved under an acidic condition. U.S. Pat. No. 3,506,494, which was submitted in 1966, also reports the effects of ten metal additives such as tungsten, tantalum and niobium.

The catalytic reaction proceeds on the surface of nanosize catalyst particles, and hence a few atomic layers positioned at the catalyst surface give a large effect on the catalytic efficiency. Even if consisting of the same components, the catalysts may have very different surface conditions according to their synthesizing processes. For example, JP-A 2005-259557 (KOKAI) describes an anode catalyst-preparation process in which metals of 4- to 6-groups in the periodic table are incorporated to the PtRu alloy by the impregnation method. In JP-A 2005-259557 (KOKAI), it is reported that the methanol activity of the resultant catalyst greatly depends upon the order of impregnation. However, with respect to the mixing ratio among Pt, Ru and the metals of 4- to 6-groups, JP-A 2005-259557 (KOKAI) discloses only one ratio, namely, Pt:Ru:additive metal=317.7:82.3:100 by weight.

It is now still being studied to control the process for synthesizing catalyst and thereby to obtain catalyst particles having such a novel nanostructure that the resultant catalyst has higher activity than the PtRu alloy. For synthesizing the catalyst, a solution method such as the impregnation method has been hitherto generally used. However, when the catalyst is synthesized from elements hard to be reduced or alloyed, it is very difficult in the solution method to control the structure and/or surface condition of the catalyst.

On the other hand, processes of sputtering and vapor-deposition are advantageous for synthesizing the catalyst from the viewpoint of controlling the materials. However, it is not fully studied how those processes are affected or influenced by the processing conditions such as vapor elements, vapor composition, materials of the substrate, and temperature of the substrate. Since the catalyst particles are normally in the form of nanoparticles, the surface electronic state and nanostructure thereof are apt to depend greatly upon what and how much additive element is incorporated. Therefore, in order to obtain catalyst particles having high activity and excellent stability, it is thought to be necessary that favorable additive elements suitably combined in optimal amounts be incorporated into the catalyst particles.

U.S. Pat. No. 6,171,721 discloses a four-element type catalyst synthesized by sputtering. This patent describes many examples of elements usable as the additives, but is silent about the compositions or ratios of those elements. JP-A 2007-194217 (KOKAI) describes Ge in relation to a fuel cell cathode catalyst, but Ge is not indispensable and a notable effect given by Ge is not suggested. JP-A 2007-87617 (KOKAI) discloses that at least one element selected from the group consisting of Cu, Re and Ge can be used as an additive incorporated into the PtRu catalyst. However, also in this publication, Ge is not indispensable and an effect of Ge is not suggested.

SUMMARY OF THE INVENTION

The present invention resides in a fuel cell catalyst comprising an electronically conductive support and catalyst fine particles which are supported on said support and which are represented by the following formula (1):

   (1)

in which the element represented by T is at least one selected from the group consisting of Al, Si, Ni, W, Mo, V, Ta, Ti, Hf, Sn, Zr, Nb and Cr; u means 30 to 60 atm %, x means 20 to 50 atm %, y means 0.5 to 20 atm %, and z means 0.5 to 40 atm %; wherein, in the case where said T-element in the largest amount is Al, Si, Ni, W, Mo, V or Cr, the content of the T-element's atoms connected with oxygen bonds is not more than four times as large as that of the T-element's atoms connected with metal bonds on the basis of X-ray photoelectron spectrum analysis; and in the case where said T-element in the largest amount is Ti, Hf, Sn, Ta, Zr or Nb, the content of the T-element's atoms connected with metal bonds is not more than twice as large as that of the T-element's atoms connected with oxygen bonds on the basis of X-ray photoelectron spectrum analysis.

The present invention also resides in a process for preparation of the above fuel cell catalyst, comprising the step of attaching Pt, Ru, Ge and the T-element onto the electronically conductive support by sputtering or by vapor-deposition.

Further, the present invention still also resides in a membrane electrode assembly comprising a cathode, an anode containing the above fuel cell catalyst, and a proton-conductive membrane placed between said cathode and said anode.

Furthermore, the present invention yet also resides in a fuel cell comprising the above membrane electrode assembly.

The present invention provides a catalyst having high activity and excellent stability, a process for preparation of the catalyst, a membrane electrode assembly and a fuel cell.

DETAILED DESCRIPTION OF THE INVENTION

Figure 1:
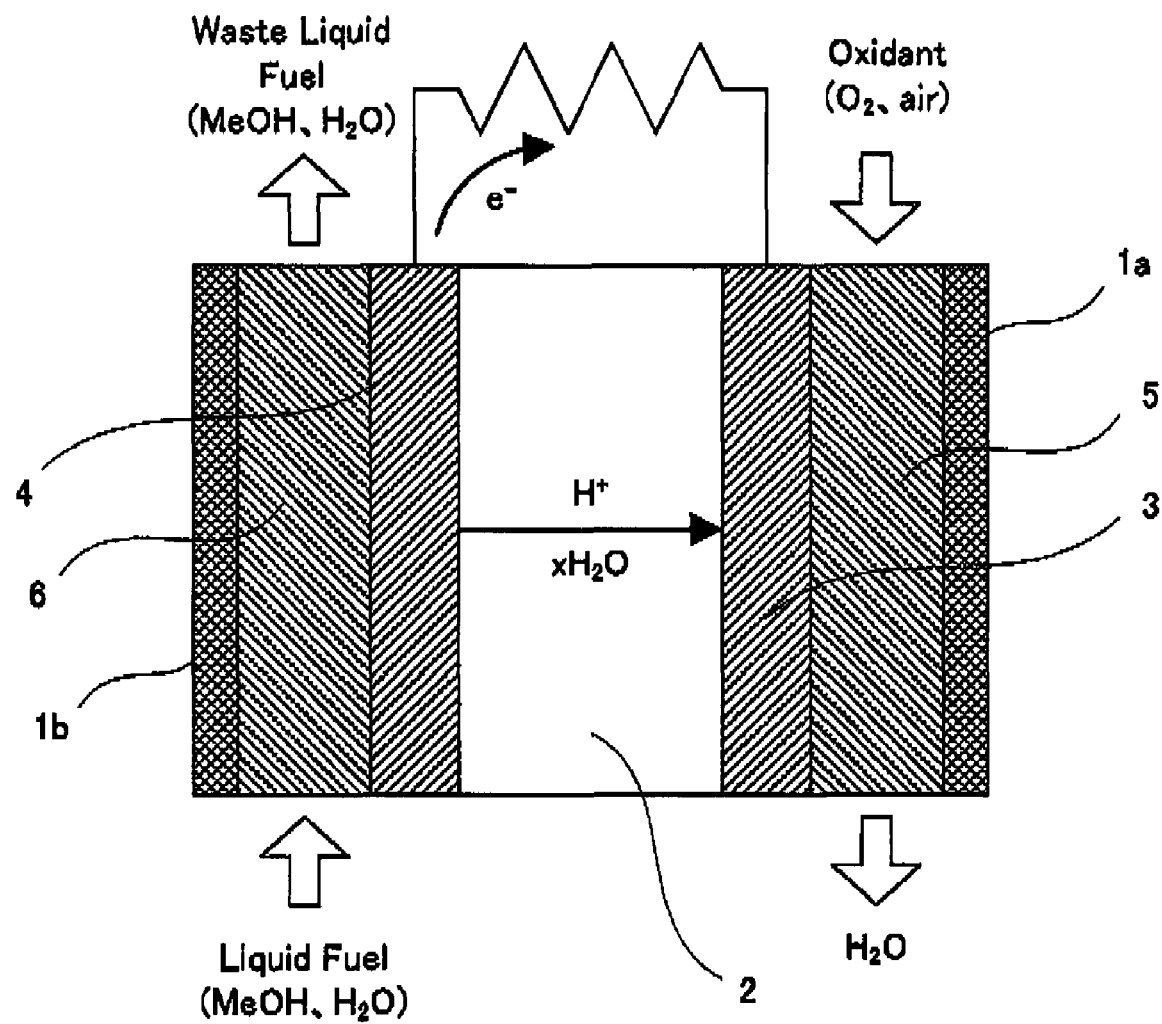
FIG. 1 is a schematic cross-sectional view showing a structure of a direct methanol fuel cell according to one embodiment of the present invention.

For the purpose of achieving the above object, the present inventors have been studied about the process for synthesizing the catalyst and the composition thereof. As a result, it is found that, if catalyst particles represented by the above formula (1) are formed on an electronically conductive support by sputtering or by vapor-deposition, the obtained PtRu alloy doped with the T element serves as a catalyst having high activity and excellent stability.

Embodiments of the present invention are described below.

The catalyst according to the present invention is a four-or more-element type catalyst indispensably containing Pt, Ru, Ge and at least one element (i.e., T-element) selected from the group consisting of Al, Si, Ni, W, Mo, V, Ta, Ti, Hf, Sn, Zr, Nb and Cr. The composition of the catalyst can be represented by the following formula (1):

$$Pt_u Ru_x Ge_y T_z \quad (1)$$

in which T is at least one element selected from the group consisting of Al, Si, Ni, W, Mo, V, Ta, Ti, Hf, Sn, Zr, Nb and Cr; u means 30 to 60 atm %, x means 20 to 50 atm %, y means 0.5 to 20 atm %, and z means 0.5 to 40 atm %.

[Pt and Ru]

In the catalyst of the present invention, Pt effectively works for oxidizing hydrogen and for dehydrogenation from organic fuel while Ru effectively prevents CO from poisoning.

If the content of Ru is small, the activity is often lowered. Accordingly, it is necessary that u and x be in the ranges of 30 to 60 atm % and 20 to 50 atm %, respectively. In the catalyst, the Pt atoms may be connected with not only metal bonds but also oxygen bonds. It is presumed that the catalyst has an oxide layer containing Pt, Ru, Ge and the T element on its surface, and thereby that high activity and excellent stability can be obtained. Further, the activity is sometimes improved if PtRu is partly replaced with other platinum metals such as Rh, Os and Ir, which are excellent in chemical stability.

In the catalyst of the present invention, the Pt atoms connected with oxygen bonds are contained in too small an amount to be confirmed by X-ray photoelectron spectroscopy (hereinafter, often referred to as XPS). However, they can be analyzed by means of X-ray absorption near edge structure (hereinafter, often referred to as XANES) measurement in which the XANES spectrum of the catalyst is compared with that of Pt metal foil (standard sample) or Pt oxide (standard sample).

[Ge]

The activity is often improved by adding Ge into the PtRu alloy. The detailed mechanism of this activity improvement effect is unknown, but it is considered that the Ge mixed in a particular state changes the surface condition and/or electronic structure of the catalyst to improve the activity. Further, if the catalyst contains Ge atoms connected with metal bonds, the activity is sometimes enhanced. The catalyst particles represented by the formula (1) indispensably contain Ge in an amount of 0.5 to 20 atm %. If the Ge content is less than 0.5 atm % or more than 20 atm %, Ge cannot fully serve as a promoter. The Ge content is more preferably in the range of 1 to 10 atm %.

[T-element]

The catalyst according to the present invention comprises the T-element as well as the PtRuGe alloy. Since the T-element is incorporated as a promoter, the activity is further improved as compared with the PtRu or PtRuGe alloy alone. The content of the T-element must be in the range of 0.5 to 40 atm %. In the case where the T-element is a mixture of plural elements, the total amount of the T-elements must be in the range of 0.5 to 40 atm %. In other words, it is necessary that the total amount of Pt, Ru and Ge be in the range of 60 to 99.5 atm %.

In the present invention, the T-element is at least one selected from the group consisting of Al, Si, Ni, W, Mo, V, Ta, Ti, Hf, Sn, Zr, Nb and Cr. Those elements are classified into two groups.

One is the group consisting of Al, Si, Ni, W, Mo, V and Cr. In the case where the T-element belongs to this group (hereinafter, the T-element contained in this group is often referred to as "T1-element"), the content of the T-element's atoms connected with oxygen bonds is indispensably not more than four times, preferably not more than twice as large as that of the T-element's atoms connected with metal bonds on the basis of XPS analysis.

The other is the group consisting of Ti, Hf, Sn, Ta, Zr and Nb. In the case where the T-element belongs to this group (hereinafter, the T-element contained in this group is often referred to as "T2-element"), the content of the T-element's atoms connected with metal bonds is indispensably not more than twice as large as, preferably not larger than that of the T-element's atoms connected with oxygen bonds on the basis of XPS analysis.

The XPS analysis is carried out under the following conditions.

System: high-resolution XPS spectrometer ESCA-300 ([trademark], available from Scienta Instrument AB), X-ray: single crystal-monochromatized Al Kα line, Path energy: 150 eV (0.1 eV/step), Geometry: θ=90° (θ is an angle between the sample surface and the detector), and Charge correction: C1s=284.5 eV.

The XPS measurement can detect only the photoelectrons (signals) in a depth range from the surface to a few nanometers, and therefore it can be confirmed that the T-element's atoms connected with metal bonds, namely, the T-element in the metal state is present in that depth range. It is important but still unknown in detail how the metal bonds electronically interact with other catalytic metals, particularly, how the metal bonds between the T-element's atoms and Pt or Ru atoms effect the interactions thereof. It is thought that metal nanoparticles consisting of only the T-element cannot stably exist in the atmosphere, and hence the T-element is present in the form of an alloy with PtRuGe in the catalyst according to the present invention.

The XPS measurement largely reflects properties of the surface and the areas nearby. Accordingly, if an oxide layer is formed on the catalyst particles, there is strong possibility that the T-element's atoms connected with oxygen bonds exhibit a larger peak area (signal) than those connected with metal bonds in the XPS spectrum. It can be also confirmed by extended X-ray absorption fine structure (hereinafter, often referred to as EXAFS) measurement whether the catalyst of the present invention contains the T-element's atoms connected with metal bonds or not. Since X-rays used in EXAFS penetrate the whole catalyst, the EXAFS measurement gives the total information of the where catalyst like X-ray diffraction (hereinafter, often referred to as XRD) analysis does. As a result of the EXAFS measurement, a peak assigned to the metal bond (bond distance: 2 to 3 Å) connected to a T-element's atom was observed in the radial structure distribution of each T-element's atom.

The catalyst according to the present invention contains the T-element's atoms connected to another element's atoms with oxygen bonds in a depth range from the surface to a few nanometers. The T-element's atoms connected with oxygen bonds are difficult to exist inside of the catalyst, and hence are present near the surface. It is presumed that these T-element's atoms play an important role in forming the surface oxide layer. Further, since the catalyst also contains the Pt atoms connected with oxygen bonds, it may be further important to incorporate the T-element. It is considered that the catalytic activity is improved by the T-element contributing to the surface oxide layer.

In the present embodiment, the T-element's atoms can be connected with metal bonds. The T-element's atoms connected with metal bonds may electronically interact with other catalytic metals to improve the catalytic activity. The content of the T-element must be in the range of 0.5 to 40 atm %. In the case where the T-element is a mixture of plural elements, the total amount of the T-elements must be in the range of 0.5 to 40 atm %. If the content of the T-element is less than 0.5 atm % or more than 40 atm %, the T-element cannot fully serve as a promoter. For obtaining satisfying effect, the content is more preferably in the range of 20 to 30 atm %.

The catalyst particles according to the present invention were analyzed by XRD, and, as a result, it was found that the main peak of the catalyst and that of the PtRu alloy were observed at different positions. It can be presumed based on this result that the alloy structure was changed by the additives of Ge and the T-element. In the catalyst fine particles according to the present invention, the distance between crystal planes is preferably in the range of 2.16 to 2.25 Å.

The catalyst fine particles used in the present embodiment can contain oxygen. The oxygen is adsorbed on the surface of the catalyst particles while they are prepared or stored, and the particles surface is oxidized while subjected to a surface oxidizing treatment such as washing with an acid. If the surface is slightly oxidized, the power and stability are sometimes improved. The oxygen content of the catalyst fine particles is preferably not more than 25 atm %. If it is more than 25 atm %, the catalytic activity is often considerably lowered.

When the catalyst particles of the present embodiment are in the form of nanoparticles, they have the highest activity. The catalyst particles preferably have a mean particle size of 10 nm or less. If it is larger than 10 nm, the catalytic activity may be considerably lowered. The mean particle size is more preferably in the range of 0.5 to 8 nm. If it is less than 0.5 nm, it is difficult to control the process for synthesizing the catalyst and accordingly the production cost is increased. Here, the "mean particle size" means a sphere-reduced mean particle size calculated from the projection cross-sectional area observed by electron microscopy. The catalyst particles may be in the form of fine particles having a mean particle size of 10 nm or less, or otherwise in the form of aggregates (secondary particles) of those fine primary particles.

The electronically conductive support is, for example, carbon black, but is not restricted to that. Any material can be used as the support as long as it is excellent in electronic conductivity and stability. For example, the support can be recently developed nanocarbon materials in the forms of fibers, tubes and coils. The catalyst particles of the present embodiment can be supported on those materials according to the surface conditions thereof, and thereby the catalytic activity can be further improved. Besides the carbon materials, ceramic materials are also usable as the support. In that case, a synergistic effect between the ceramic support and the catalyst particles can be expected.

[Process for Preparation of Catalyst]

The process for preparation of the catalyst according to the present embodiment is described below. The catalyst of the present embodiment is synthesized, for example, by the sputtering process or by the vapor-deposition process. Those processes have the advantage that the catalyst in a particular mixing state including metal bonds can be easily synthesized as compared with a solution method such as the impregnation method, the precipitation method or the colloidal method. It is difficult to prepare the catalyst of the present embodiment by the conventional solution method. For example, even if it is attempted to prepare a polynuclear complex of Pt, Ru, Ge and the T-element combined with metal bonds, to impregnate it into the support and then to reduce it according to the conventional solution method, it is practically very difficult to synthesize the polynuclear complex and consequently the catalyst of the present embodiment cannot be obtained. In addition, the solution method is presumed to increase the production cost. Further, even if the electrodeposition method or the electrophoresis method is used to prepare the catalyst of the present embodiment, it is difficult to control the process for forming nanoparticles and hence it is also presumed to increase the production cost.

The sputtering process for attaching the catalyst particles onto the electrically conductive support is explained below. In this sputtering process, an alloy target can be used or otherwise two or more metals can be simultaneously sputtered. First, the electrically conductive support in the form of particles or fibers is sufficiently dispersed. The dispersed support is then placed in a holder installed in a chamber of sputtering apparatus. While the support in the holder is being stirred, the component metals of the catalyst are attached onto the support by sputtering. During the sputtering process, the electronically conductive support is preferably kept at a temperature of 400° C. or below. If the temperature is higher, the catalyst particles often undergo phase separation, so that the catalytic activity becomes unstable.

In order to reduce the cost of cooling the support, the temperature of the support in sputtering is preferably 10° C. or higher. The temperature of the support can be measured with a thermocouple. For the purpose of attaching the catalyst evenly, it is important to stir the support. If the support is not stirred, the catalyst is so unevenly deposited that the resultant fuel performance is impaired.

The catalytic metals in the present embodiment can be sputtered directly onto porous paper containing electrically conductive carbon fibers, an electrode diffusion layer or an electrolyte membrane. In this case, it is necessary to control the process so as to deposit the catalyst in the form of nanoparticles. The porous paper is also preferably kept at a temperature of 400° C. or below.

In the following description, the vapor-deposition process for attaching the catalyst particles onto the electrically conductive support is explained. As the vapor-source, component metals of the catalyst particles or an alloy thereof can be used. The vapor-source and the electrically conductive support, on which the catalyst particles are to be supported, are placed in a reduced-pressure container. After the container is sealed and evacuated, the vapor-source is heated, if necessary, to load the catalyst particles onto the electrically conductive support.

After synthesized by sputtering or by vapor-deposition, the catalyst particles may be subjected to an acid-washing treatment or to a heating treatment. The activity is sometimes improved by those treatments. The reason of that is presumed to be because the catalytic structure or the surface condition is further optimized by the acid-washing treatment or by the heating treatment. In the acid-washing treatment, any acidic aqueous solution can be used. For example, an aqueous solution of sulfuric acid can be used. The heating treatment is preferably carried out at a temperature of 10 to 400° C. under an oxygen partial pressure of less than 5%. The component metals may be sputtered or vapor-deposited together with other materials such as carbon so that the fine particles can be easily formed. In the present embodiment, it is also possible to sputter or vapor-deposit the component metals together with other metals of high solubility such as Cu and Zn, which can be removed by the acid-washing treatment.

On the other hand, even if it is attempted to prepare the catalyst particles according to the solution method, the product is almost a mixture of PtRu fine particles and oxide particles of Ge and the T-element. This is because the T-element hardly undergoes the reduction reaction and hence is not alloyed with Pt, Ru and Ge. If the product obtained by the solution method is subjected to XPS surface analysis, it can be found that most of the T-element's atoms are connected to other elements' atoms with oxygen bonds. In fact, as a result of the EXAFS measurement, a strong peak assigned to the oxygen bond (bond distance: <2 Å) connected to a T-element's atom was observed in the radial structure distribution of the T-element's atom while a peak assigned to the metal bond was scarcely observed.

As described above, when the catalyst is synthesized from elements, such as the T-element, hard to be reduced or alloyed, it is difficult in the solution method to control the structure and surface condition of the catalyst. Accordingly, it is difficult for the solution method to improve the activity.

In the following description, the structure of a fuel cell according to one embodiment of the present invention is explained.

FIG. 1 is a schematic cross-sectional view showing a single cell of the fuel cell. The fuel cell in FIG. 1 comprises a housing 1a and 1b, an electrolyte membrane 2, an oxidant electrode (cathode) 3, a fuel electrode (anode) 4, an oxidant path 5, and a liquid fuel path 6. In the housing 1a and 1b, the electrolyte membrane 2 is placed between the oxidant electrode (cathode) 3 and the fuel electrode (anode) 4, outside of which the oxidant path 5 and the liquid fuel path 6 are placed.

The electrolyte membrane 2 is, for example, an ion-exchange membrane. The ion-exchange membrane may be cation-transport type or anion-transport type, but is preferably proton-transport type. For example, a polymer membrane capable of transporting cations or anions, such as a membrane of perfluoroalkylsulfonic acid polymer, can be used.

The electrolyte membrane 2 may be supported between the oxidant electrode 3 and the fuel electrode 4, or otherwise they may be unified by hot-pressing, cast-film forming or the like to form a membrane electrode assembly (hereinafter, often referred to as MEA). If necessary, a water-repelling agent such as polytetrafluoroethylene can be incorporated in or coated on the porous carbon paper.

The fuel electrode 4 contains the aforementioned methanol oxidizing catalyst as an effective component. The fuel electrode 4 is placed in contact with the electrolyte membrane 2. In order to bring the fuel electrode 4 in contact with the electrolyte membrane 2, known methods such as hot-pressing and cast-film forming can be used.

The oxidant electrode 3 is often made of a mixture of ion-conductive material and platinum-supported carbon, and is placed in contact with the electrolyte membrane 2. If the ion-conductive material is the same as the material of the electrolyte membrane 2, a favorable result is obtained in many cases. In order to bring the oxidant electrode 3 in contact with the electrolyte membrane 2, known methods such as hot-pressing and cast-film forming can be used. Besides the platinum-supported carbon, known catalysts such as noble metals, supported catalysts thereof (electrode catalysts), organic metal complexes and fired products thereof are usable as the material of the oxidant electrode 3. These catalysts can be directly used without the supporting support.

Generally on the side of the oxidant electrode 3, an oxidant inlet (not shown) for introducing the oxidant (normally, air) is provided above, and an oxidant outlet (not shown) for exhausting the unreacted air and the product (normally, water) is provided below. In this case, a forced draft and/or exhaust system can be installed. Further, an opening for natural convection of air may be provided on the housing 1a.

On the side of the fuel electrode 4, the liquid fuel path 6 is provided. The liquid fuel path 6 may be connected to an external liquid fuel reservoir (not shown), but may reserve the liquid fuel in itself. Generally, an outlet (not shown) for exhausting the unreacted methanol and the product (normally, $CO_2$) is provided below. Also in this case, a forced supply and/or exhaust system can be installed.

The liquid fuel directly supplied to the fuel electrode 4 is preferably methanol or a mixture of water and methanol. However, if a mixture of water and methanol is supplied, the crossover is so effectively prevented that satisfying electromotive force is apt to be obtained from the single cell.

In the schematic view of FIG. 1, a single cell of the direct methanol fuel cell is shown. In the present embodiment, the shown single cell may be alone used or otherwise may be combined in series or in parallel with other cells. The cells may be connected with bipolar plates according to the conventional connection system, but the flat connection system can be also used. Needless to say, other known connection systems can be employed.

In addition to methanol, other liquid fuels such as ethanol, formic acid and aqueous solutions containing one or more of them are usable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLES

Embodiments of the present invention are explained below with the following examples referred to, but these examples by no means restrict the invention.

Examples 1 to 8, 11 to 20, and Comparative Examples 1 to 4, 6 to 9

First, carbon black support (Vulcan XC72 [trademark], available from Cabot corporation; specific surface area: approximately 230 m$^2$/g) was dispersed well. The dispersed support was then placed in a holder installed in a chamber of ion-beam sputtering apparatus. The chamber was evacuated to 3×10$^{-6}$ Torr or below, and Ar gas was introduced therein. Thereafter, sputtering was carried out. As the targets, metals or alloys proper to obtain various compositions set forth in Table 1 were employed. Thus, catalyst particles were attached on the support. The supported catalyst obtained by the sputtering was washed with an aqueous solution of sulfuric acid (sulfuric acid: 10 g, water: 200 g), again washed with water, and then dried.

Examples 9 to 10

First, carbon black support (Vulcan XC72 [trademark], available from Cabot corporation; specific surface area: approximately 230 m$^2$/g) was dispersed well. The dispersed support was then placed in a holder installed in a chamber of laser-pulse sputtering apparatus. The chamber was evacuated to 3×10$^{-6}$ Torr or below, and then sputtering was carried out. As the targets, metals or alloys proper to obtain various compositions set forth in Table 1 were employed. Thus, catalyst particles were attached on the support. The supported catalyst obtained by the sputtering was washed with an aqueous solution of sulfuric acid (sulfuric acid: 10 g, water: 200 g), again washed with water, and then dried.

Comparative Example 5

In 1000 mL of ethanol solution containing 269 mg of germanium (IV) chloride in terms of germanium metal amount and 681 g of tungsten chloride in terms of tungsten metal amount, 800 mg of carbon black support (Vulcan XC72 [trademark], available from Cabot corporation; specific surface area: approximately 230 m$^2$/g) was added and stirred well to be dispersed evenly. The mixture was then heated at 55° C. to evaporate and remove the ethanol. The residue was heated at 300° C. for 3 hours to load the germanium and tungsten onto the carbon black. Independently, 800 mL of cyclohexane solution containing 2890 mg of 1,5-cyclooctadienedimethyl platinum in terms of platinum metal amount was mixed with 200 mL of ethanol solution containing 1498 mg of ruthenium chloride in terms of ruthenium metal amount. To the mixed solution, the above-prepared carbon black loaded with germanium and tungsten was added and stirred well to be dispersed evenly. The obtained suspension was heated at 55° C. to evaporate and remove the solvents. The residue was heated at 300° C. for 3 hours in a stream of hydrogen gas at 50 mL/minute, to obtain supported catalyst of carbon black loaded with platinum, ruthenium, germanium and tungsten.

The catalysts prepared above were subjected to XPS measurement with high-resolution XPS spectrometer ESCA-300 ([trademark], available from Scienta Instrument AB). In the measurement, charge-up compensation and charge correction (C1s: C-C=284.6 eV) were performed by means of a neutralizing gun (electron gun, argon gun).

In the case where the catalyst particles contained plural T-elements, the T-element in the largest amount was defined as the main T-element. For example, the main T-element of the catalyst particles in Example 5 is Hf, and that in Comparative Example 4 is W and Sn. The main T-elements of the catalysts in Examples 1 to 20 and Comparative Examples 3 to 9 were the T1-elements, namely, Al, Si, Ni, W, Mo, V or Cr. In their XPS spectra, it was confirmed that the peak area assigned to oxygen bonds connected to the T1-element's atoms was not more than four times as large as that assigned to metal bonds connected to the T1-element's atoms. Also in the case where the main T-element was the T2-element, namely, Ti, Hf, Sn, Ta, Zr or Nb, it was confirmed in the XPS spectrum that the peak area assigned to metal bonds connected to the T2-element's atoms was not more than twice as large as that assigned to oxygen bonds connected to the T2-element's atoms.

As shown in Table 2, for practically analyzing V (vanadium) element, its V2p spectrum was employed. In the V2p spectrum, peaks in the bonding energy ranges of 512 to 513 eV and 516 to 517 eV were assigned to the metal bonds and the oxygen bonds, respectively. For analyzing Hf (hafnium) element, its Hf4f spectrum was employed. In the Hf4fp spectrum, peaks in the bonding energy ranges of 14 to 15 eV and 17 to 19 eV were assigned to the metal bonds and the oxygen bonds, respectively. For analyzing Nb (niobium) element, its Nb3d spectrum was employed. In the Nb3d spectrum, peaks in the bonding energy ranges of 202 to 203 eV and 203 to 209 eV were assigned to the metal bonds and the oxygen bonds, respectively. For analyzing W (tungsten) element, its W4f spectrum was employed. In the W4f spectrum, peaks in the bonding energy ranges of 31 to 34 eV and 36 to 40 eV were assigned to the metal bonds and the oxygen bonds, respectively. In the case where the two peaks were overlapped, they were resolved by waveform separation into the signal of the metal bonds and that of the oxygen bonds.

In Table 1, each value in the section of "T1-peak area ratio" is a relative size of the peak area assigned to the oxygen bonds provided that the size of that assigned to the metal bonds is regarded as 1. Also, each value in the section of "T2-peak area ratio" is a relative size of the peak area assigned to the metal bonds provided that the size of that assigned to the oxygen bonds is regarded as 1.

The supported catalysts prepared in Examples 1 to 20 were subjected to XRD measurement, and the obtained diffraction patterns indicated that the distance between crystal planes giving the main peak was in the range of 2.16 to 2.25 Å.

The mean particle size of each catalyst was determined in the following manner. With respect to each catalyst, randomly selected five different aspects were observed with a transmission electron microscope. In each aspect, diameters of 20 particles were measured. The thus-measured 100 diameters in total were averaged and, as a result, it was found that the particles of each catalyst had a mean particle size of 3 to 5 nm.

The catalysts synthesized in Examples 1 to 20 and Comparative Examples 1 to 9 were used as anode catalysts, and thereby fuel cells, membrane electrode assemblies and single cells were produced in the following manner and then evaluated.

[Anode]

From each of the catalysts synthesized in Examples 1 to 20 and Comparative Examples 1 to 9, 3 g was weighed out. The weighed catalyst was mixed with 8 g of pure water, 15 g of 20% Nafion solution ([trademark], available from DuPont Co., Ltd.) and 30 g of 2-ethoxyethanol, and stirred and dispersed well to prepare slurry. The slurry was then coated by means of a control coater onto water-repelling treated carbon paper (350 μm, available from Toray Industries Inc.), and dried to produce an anode containing noble metal catalyst in a loading density of 1 mg/cm².

[Cathode]

First, 2 g of Pt catalyst (available from Tanaka Kikinzoku Kogyo K.K.) was weighed. The weighed catalyst was mixed with 5 g of pure water, 5 g of 20% Nafion solution ([trademark], available from DuPont Co., Ltd.) and 20 g of 2-ethoxyethanol, and stirred and dispersed well to prepare slurry. The slurry was then coated by means of a control coater onto water-repelling treated carbon paper (350 μm, available from Toray Industries Inc.), and dried to produce a cathode containing noble metal catalyst in a loading density of 2 mg/cm².

[Fabrication of Membrane Electrode Assembly]

Each of the cathode and the anode was cut into a square piece of 3.2×3.2 cm so that the electrode area might be 10 cm². As a proton-conductive solid polymer membrane, a membrane of Nafion 117 ([trademark], available from DuPont Co., Ltd.) was employed. The Nafion 117 membrane was inserted between the anode and the cathode, and then hot-pressed at 125° C., 30 kg/cm² for 10 minutes to fabricate a membrane electrode assembly.

The membrane electrode assembly was combined with a flowing-path plate to produce a single cell of direct-fuel type polymer electrolyte fuel cell. The obtained single cell was kept at 60° C. and discharged in the current density of 150 mA/cm² for 30 minutes under the conditions that 1M aqueous solution of methanol as a fuel was fed to the anode in the amount of 0.6 ml/minute and that air in the amount of 200 ml/minute was supplied to the cathode. Thereafter, the cell voltage was measured. The results were as set forth in Table 1.

The results of Examples 1 to 20, Comparative Examples 2 to 4, Comparative Examples 6 to 9 and Comparative Example 1 in Table 1 were compared with each other, and thereby it was revealed that the Ge or T-element improved the activity of the PtRu catalyst. Further, the results of Example 1 and Comparative Example 3 or those of Example 16 and Comparative Example 6 were compared with each other, and thereby it was revealed that the activity was remarkably improved by adding the Ge element.

The results of Examples 1 to 3, Comparative Example 7 and Comparative Example 9 were compared with each other, and thereby it was revealed that, if the Ge content was beyond the range of 0.5 to 20 atm %, the activity was lowered. On the other hand, the results of Examples 1 to 4 and Comparative Example 8 were compared with each other, and thereby it was revealed that, if the T-element content was more than 40 atm %, the activity was lowered.

Furthermore, the results of Example 1 and Comparative Example 5 were compared with each other, and thereby it was revealed that the sputtering process gave higher activity than the solution method. This effect may be attributed to the process for synthesizing the catalyst.

For evaluating the long-term stability of the catalyst, the voltage of each MEA was measured after the electric power was generated for 1000 hours. Form the obtained voltage, the deterioration ratio was calculated according to the following formula:

deterioration ratio=(initial voltage−voltage after 1000 hours)×100/initial voltage.

The results were as set forth in Table 1. As shown in Table 1, the deterioration ratios of the PtRu catalyst and the three-element type catalysts were approx. 1.5% and in the range of 1.5 to 3%, respectively. On the other hand, those of the MEAs containing the catalysts according to the present invention were in the range of 0.5 to 0.6%. Accordingly, it was evident that the deterioration ratio was remarkably improved. From those results, it can be clearly understood that the addition of Ge is effective on improving not only the activity but also the stability of the catalyst.

The effect of the present invention was also confirmed with respect to a polymer electrolyte fuel cell employing the catalyst according to the present invention. This means that the catalyst of the present invention prevents CO from poisoning more effectively than the conventional PtRu catalyst.

TABLE 1

|  | Pt | Ru | Ge | T1 element | | | T2 element | | | |
| --- | --- | --- | --- | --- | --- | --- | --- | --- | --- | --- |
|  |  |  |  | element/ratio | element/ratio | element/ratio | element/ratio | element/ratio | element/ratio | element/ratio |
| Ex. 1 | 40 | 40 | 10 | W 10 | | | | | | |
| Ex. 2 | 40 | 35 | 15 | W 10 | | | | | | |
| Ex. 3 | 35 | 35 | 20 | W 10 | | | | | | |
| Ex. 4 | 30 | 20 | 10 | W 40 | | | | | | |
| Ex. 5 | 35 | 29 | 8 | V 6 | | | Hf 15 | Nb 7 | | |
| Ex. 6 | 40 | 35 | 10 | | | | Zr 15 | | | |
| Ex. 7 | 40 | 32 | 1 | Cr 14 | | | Ti 13 | | | |
| Ex. 8 | 40 | 35 | 10 | | | | Sn 15 | | | |
| Ex. 9 | 35 | 35 | 5 | V 25 | | | Zr 11 | Ta 8 | | |
| Ex. 10 | 40 | 30 | 2 | V 9 | | | | | | |
| Ex. 11 | 35 | 30 | 10 | Ni 10 | W 15 | | | | | |
| Ex. 12 | 40 | 37 | 6 | Si 17 | | | | | | |
| Ex. 13 | 40 | 32 | 5 | Mo 10 | | | Zr 13 | | | |
| Ex. 14 | 40 | 30 | 5 | V 5 | Ni 5 | | Ta 8 | Zr 7 | | |
| Ex. 15 | 40 | 32 | 5 | W 10 | Ni 13 | | | | | |
| Ex. 16 | 35 | 30 | 10 | Ni 10 | | | Zr 15 | | | |
| Ex. 17 | 40 | 32 | 1 | Ni 14 | | | Ti 13 | | | |
| Ex. 18 | 40 | 35 | 15 | Hf 10 | | | | | | |
| Ex. 19 | 40 | 30.5 | 5 | V 5 | | | Sn 3 | Ta 6.5 | Zr 5 | Hf 5 |

TABLE 1-continued

| | Pt | Ru | Ge | T1 | amt | T2 | amt | T3 | amt | T4 | amt | T5 | amt | T6 | amt |
|---|---|---|---|---|---|---|---|---|---|---|---|---|---|---|---|
| Ex. 20 | 40 | 27 | 5 | Si | 3 | V | 5 | W | 7 | Sn | 3 | Ta | 5 | Hf | 5 |
| Com. 1 | 50 | 50 | | | | | | | | | | | | | |
| Com. 2 | 45 | 45 | 10 | | | | | | | | | | | | |
| Com. 3 | 45 | 45 | | | | W | 10 | | | | | | | | |
| Com. 4 | 40 | 40 | | | | W | 10 | | | Sn | 10 | | | | |
| Com. 5 | 40 | 40 | 10 | | | W | 10 | | | | | | | | |
| Com. 6 | 33 | 23 | | Ni | 31 | | | | | Zr | 13 | | | | |
| Com. 7 | 35 | 25 | 30 | | | W | 10 | | | | | | | | |
| Com. 8 | 30 | 20 | 5 | | | W | 45 | | | | | | | | |
| Com. 9 | 45 | 45 | 0.1 | | | W | 9.9 | | | | | | | | |

| | T1 peak area ratio | T2 peak area ratio | Synthesis Process | Voltage (V) | Deterioration ratio (%) |
|---|---|---|---|---|---|
| Ex. 1 | 0.8 | | sputtering | 0.49 | 0.5 |
| Ex. 2 | 0.8 | | sputtering | 0.48 | 0.5 |
| Ex. 3 | 0.7 | | sputtering | 0.48 | 0.5 |
| Ex. 4 | 1.9 | | sputtering | 0.47 | 0.5 |
| Ex. 5 | | 0.2 | sputtering | 0.52 | 0.5 |
| Ex. 6 | | 0.5 | sputtering | 0.50 | 0.5 |
| Ex. 7 | 2.3 | | sputtering | 0.49 | 0.5 |
| Ex. 8 | | 0.8 | sputtering | 0.48 | 0.6 |
| Ex. 9 | 0.5 | | vapor deposition | 0.49 | 0.5 |
| Ex. 10 | | 0.5 | vapor deposition | 0.48 | 0.5 |
| Ex. 11 | 0.9 | | sputtering | 0.48 | 0.5 |
| Ex. 12 | 3.5 | | sputtering | 0.49 | 0.5 |
| Ex. 13 | | 0.7 | sputtering | 0.50 | 0.5 |
| Ex. 14 | 2.8 | | sputtering | 0.52 | 0.5 |
| Ex. 15 | 1.3 | | sputtering | 0.49 | 0.5 |
| Ex. 16 | | 0.6 | sputtering | 0.49 | 0.5 |
| Ex. 17 | | 1.7 | sputtering | 0.48 | 0.5 |
| Ex. 18 | | 0.2 | sputtering | 0.49 | 0.5 |
| Ex. 19 | 2.0 | | sputtering | 0.50 | 0.6 |
| Ex. 20 | 1.2 | | sputtering | 0.50 | 0.5 |
| Com. 1 | | | sputtering | 0.42 | 1.5 |
| Com. 2 | | | sputtering | 0.44 | 1.5 |
| Com. 3 | 0.8 | | sputtering | 0.44 | 2.0 |
| Com. 4 | 1.3 | | sputtering | 0.46 | 1.0 |
| Com. 5 | 100.0 | | solution method | 0.37 | 0.5 |
| Com. 6 | | 0.5 | sputtering | 0.47 | 1.6 |
| Com. 7 | 0.7 | | sputtering | 0.46 | 0.5 |
| Com. 8 | 1.6 | | sputtering | 0.45 | 0.6 |
| Com. 9 | 0.8 | | sputtering | 0.44 | 1.9 |

TABLE 2

| Element | Peak assigned to metal bonds (eV) | | Peak assigned to oxygen bonds (eV) | |
|---|---|---|---|---|
| V | 512-513 | (2p 3/2) | 516-517 | (2p 3/2) |
| W | 31-34 | (4f 7/2) | 36-40 | (4f 5/2) |
| Mo | 227-228 | (3d 5/2) | 235-237 | (3d 5/2) |
| Nb | 202-203 | (3d 5/2) | NbO: 203-205 | (3d 3/2) |
| | | | $Nb_2O_5$: 209-211 | (3d 5/2) |
| Cr | 574 | (2p 3/2) | 576-580 | (2p 3/2) |
| Zr | 178-179 | (3d 5/2) | 184-185 | (3d 3/2) |
| Ti | 453-454 | (2p 3/2) | TiO: 455-456 | (2p 3/2) |
| | | | $TiO_2$: 459-460 | |
| Ta | 23-24 | (4f 7/2) | 27-29 | (4f 5/2) |
| Si | 99-100 | (2p) | 103-104 | (2p) |
| Al | 117-118 | (2s) | 120-121 | (2s) |
| Sn | 493-494 | (3d 3/2) | 494-496 | (3d 3/2) |
| Ni | 852-854 | (2p 3/2) | NiO: 454-455 | (2p 3/2) |
| | | | $Ni_2O_3$: 455-457 | (2p 3/2) |
| Hf | 14-15 | (4f 7/2) | 17-19 | (4f 5/2) |

As explained above, the present invention provides a catalyst having high activity and excellent stability and a fuel cell.

The present invention is by no means restricted by the embodiments described above. In practical applications, it is possible to change or modify the embodiments without departing from the scope and spirit of the present invention. Further, plural components disclosed in the above embodiments can be optionally combined to form various embodiments of the invention. For example, some can be omitted from all the components shown in the embodiments. Further, it is also possible to properly combine the components of different embodiments.

The invention claimed is:

1. A fuel cell catalyst comprising an electrically conductive support and catalyst fine particles which are supported on said support and which are represented by the following formula (1):

$$Pt_u Ru_x Ge_y T_z \qquad (1)$$

in which the element represented by T is at least one selected from the group consisting of Al, Si, Ni, W, Mo, V, Ta, Ti, Hf, Sn, Zr, Nb and Cr; u is in the range of 30 to 60 atm %, x is in the range of 20 to 50 atm %, y is in the range of 0.5 to 20 atm %, and z is in the range of 0.5 to 40 atm %; wherein, in the case where said T-element in the largest amount is Al, Si, Ni, W, Mo, V or Cr, the content of the T-element's atoms connected with oxygen bonds is not more than four times as large as that of the T-element's atoms connected with metal bonds on the basis of X-ray photoelectron spectrum analysis; and in the case where said T-element in the largest amount is Ti, Hf, Sn, Ta, Zr or Nb, the content of the T-element's atoms connected with metal bonds is not more than twice as large as that of the T-element's atoms connected with oxygen bonds on the basis of X-ray photoelectron spectrum analysis.

2. The catalyst according to claim 1, wherein Pt and Ru are partly replaced with at least one platinum metal selected from the group consisting of Rh, Os and Ir.

3. The catalyst according to claim 1, wherein y is in the range of 1 to 10 atm %.

4. The catalyst according to claim 1; wherein,
in the case where said T-element in the largest amount is Al, Si, Ni, W, Mo, V or Cr, the content of the T-element's atoms connected with oxygen bonds is not more than twice as large as that of the T-element's atoms connected with metal bonds on the basis of X-ray photoelectron spectrum analysis.

5. The catalyst according to claim 1; wherein,
in the case where said T-element in the largest amount is Ti, Hf, Sn, Ta, Zr or Nb, the content of the T-element's atoms connected with metal bonds is not larger than that of the T-element's atoms connected with oxygen bonds on the basis of X-ray photoelectron spectrum analysis.

6. The catalyst according to claim 1, wherein the distance between crystal planes in said catalyst fine particles is in the range of 2.16 to 2.25 Å.

7. The catalyst according to claim 1, wherein the oxygen content in said catalyst fine particles is not more than 25 atm %.

8. The catalyst according to claim 1, wherein said catalyst fine particles have a mean particle size of 0.5 to 10 nm.

9. The catalyst according to claim 1, wherein said electrically conductive support is carbon black.

10. The catalyst according to claim 1, wherein said electrically conductive support is porous paper containing electrically conductive carbon fibers, an electrode diffusion layer or an electrolyte membrane.

11. A process for preparation of the fuel cell catalyst according to claim 1, comprising the step of attaching Pt, Ru, Ge and the T-element onto said electrically conductive support by sputtering or by vapor-deposition.

12. The process according to claim 11, wherein said electrically conductive support is kept at a temperature of 10 to 400° C.

13. The process according to claim 11, wherein an alloy target is used or otherwise two or more metals are simultaneously sputtered in the sputtering process.

14. The process according to claim 11, wherein catalyst particles are formed by sputtering or by vapor-deposition, and then subjected to an acid-washing treatment or to a heating treatment.

15. The process according to claim 14, wherein the heating treatment is carried out at a temperature of 10 to 400° C. under an oxygen partial pressure of less than 5%.

16. A membrane electrode assembly comprising a cathode, an anode containing the fuel cell catalyst according to claim 1, and a proton-conductive membrane placed between said cathode and said anode.

17. A fuel cell comprising the membrane electrode assembly according to claim 16.

* * * * *